UNITED STATES PATENT OFFICE.

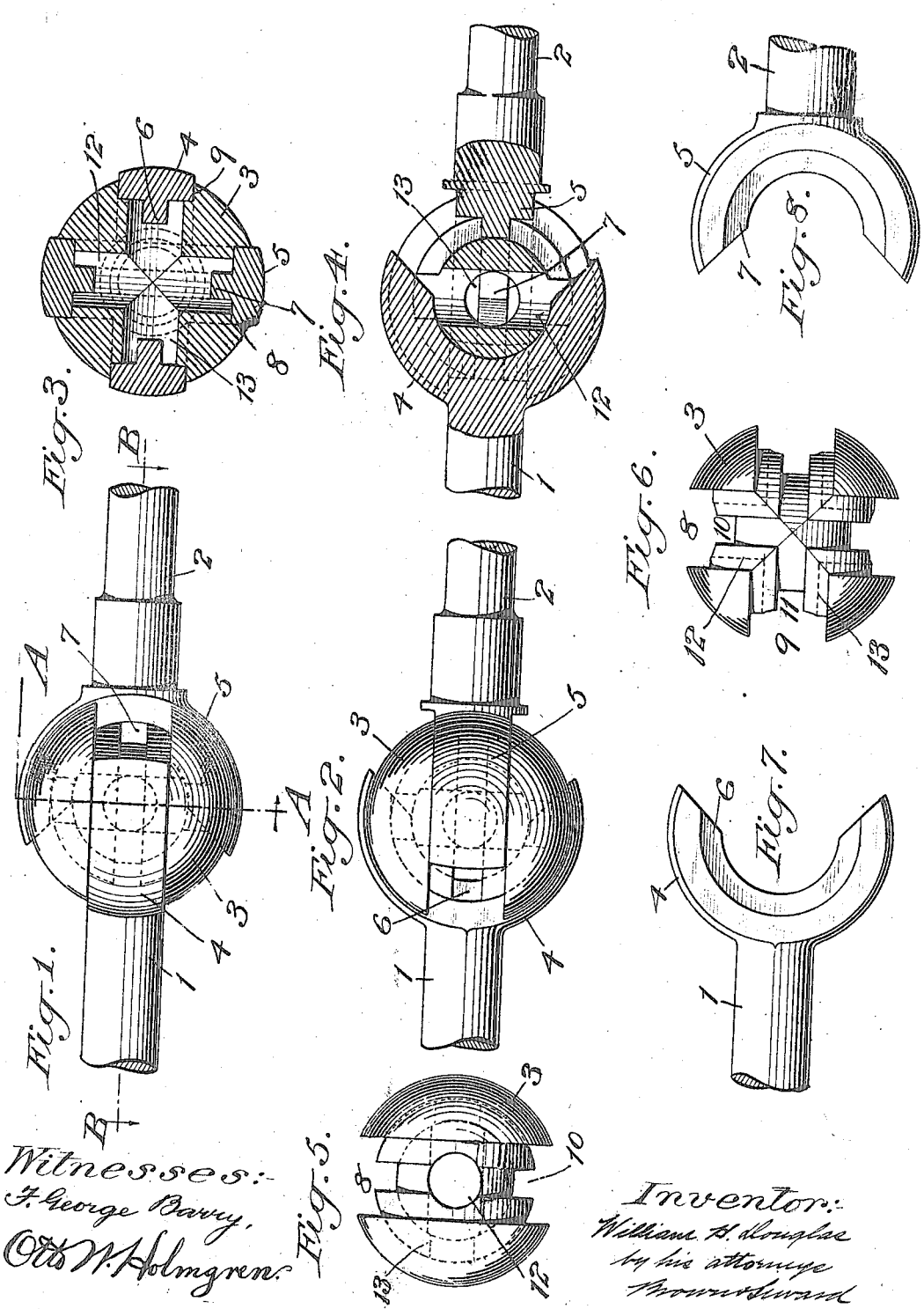

WILLIAM H. DOUGLAS, OF BELLEVILLE, NEW JERSEY, ASSIGNOR TO HEALEY & COMPANY, OF NEW YORK, N. Y., A CORPORATION OF NEW YORK.

UNIVERSAL JOINT.

1,135,967. Specification of Letters Patent. Patented Apr. 13, 1915.

Application filed October 16, 1911. Serial No. 654,995.

*To all whom it may concern:*

Be it known that I, WILLIAM H. DOUGLAS, a citizen of the United States, and resident of Belleville, in the county of Essex and State of New Jersey, have invented a new and useful Improvement in Universal Joints, of which the following is a specification.

The object of this invention is to provide a novel universal joint which will be extremely simple in construction, which may be readily lubricated, which will do away with the use of connecting pins or bolts and which will be very strong.

A practical embodiment of my invention is represented in the accompanying drawings, in which—

Figure 1 represents the universal joint in side elevation, Fig. 2 is a view of the same in top plan, Fig. 3 is a cross section taken in the plane of the line A—A of Fig. 1, Fig. 4 is a longitudinal section taken in the plane of the line B—B of Fig. 1, Fig. 5 is a plan view of the block member, Fig. 6 is a side view of the same, Fig. 7 is a plan view of one yoke member, and Fig. 8 is a plan view of the other yoke member.

The universal joint consists of only three parts, viz; the yoke members 1, 2, and interposed block member 3, so interlocked as to permit the transmission of rotary movement from one yoke member to the other yoke member irrespective of the angular relationship between the axes of the two yoke members within a limited degree.

The yoke member 1 is provided with a segmental yoke 4 and the yoke member 2 with a segmental yoke 5, the inner faces of said yokes being stepped, as shown at 6 and 7, respectively, for the purpose of insuring an extended bearing of the yokes in the block member 3. This block member 3 is provided with crossed surface grooves 8 and 9 which are preferably cylindrical in form and are stepped, as shown at 10, 11, to receive the stepped portions of the segmental yokes.

The yoke members have a free sliding movement in the crossed surface grooves of the block member and the parts are herein shown with the yokes of the two members disposed at right angles to each other and the crossed surface grooves in the interposed block member are disposed at right angles to each other.

The block member has a lubricant distributing chamber which is herein shown as being formed by crossed holes 12, 13, leading diametrically through the block member and opening into the crossed surface grooves. When this chamber is filled with a suitable lubricant, it will furnish the same to the joints between the yoke members and the interposed block member in sufficient quantities to insure a proper lubrication of the same.

It will be seen that by the provision of stepped yoke members and stepped crossed grooves, an extended surface connection is provided between the yoke members and interposed block member.

A universal joint constructed and arranged substantially as herein set forth obviates the necessity of utilizing cross bolts or pins. Furthermore, the parts are compact and are so arranged as to permit a range of considerable angularity between the axes of the two yoke members without materally interfering with their transmission ability. The joint is also one which may be very readily assembled and disassembled without the use of tools of any character.

It is evident that various changes might be resorted to in the form, construction and arrangement of the parts without departing from the spirit and scope of my invention; hence I do not wish to limit myself strictly to the structure herein set forth, but

What I claim is:—

A universal joint, consisting of a block member having two concentric surface grooves of different widths, one within the other, and two more similar grooves arranged at right angles to the first-named grooves, and two inwardly stepped yoke members adapted to coact with said grooves, each member being removably held in sliding engagement with its two concentric grooves of the block member.

In testimony, that I claim the foregoing as my invention, I have signed my name in presence of two witnesses, this 9th day of October, 1911.

WILLIAM H. DOUGLAS.

Witnesses:
F. GEORGE BARRY,
OTTO W. HOLMGREN.